(12) United States Patent
Lee et al.

(10) Patent No.: US 7,746,942 B2
(45) Date of Patent: Jun. 29, 2010

(54) APPARATUS AND METHOD FOR CONTROLLING DYNAMIC RANGE OF WEIGHT VECTORS ACCORDING TO COMBINING METHODS IN A MOBILE STATION EQUIPPED WITH MULTIPLE ANTENNAS IN HIGH RATE PACKET DATA SYSTEM USING CODE DIVISION MULTIPLE ACCESS SCHEME

(75) Inventors: Dong-Lae Lee, Yongin-si (KR); Jong-Han Lim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 825 days.

(21) Appl. No.: 11/698,803

(22) Filed: Jan. 26, 2007

(65) Prior Publication Data
US 2007/0195900 A1 Aug. 23, 2007

(30) Foreign Application Priority Data
Jan. 26, 2006 (KR) .................. 10-2006-0008551

(51) Int. Cl.
*H04K 1/10* (2006.01)
*H04L 27/00* (2006.01)
(52) U.S. Cl. .................. 375/260; 375/150; 375/152; 375/316; 375/347
(58) Field of Classification Search .................. 375/260, 375/267, 316, 150, 152, 347
See application file for complete search history.

(56) References Cited

U.S. PATENT DOCUMENTS

| 6,067,324 | A | * | 5/2000 | Harrison | 375/267 |
| 7,366,247 | B2 | * | 4/2008 | Kim et al. | 375/267 |
| 7,636,573 | B2 | * | 12/2009 | Walton et al. | 455/454 |
| 2003/0031234 | A1 | | 2/2003 | Smee et al. | |
| 2003/0125040 | A1 | | 7/2003 | Walton et al. | |
| 2004/0184513 | A1 | | 9/2004 | Lundby et al. | |

FOREIGN PATENT DOCUMENTS

| KR | 1020040002968 | 1/2004 |
| KR | 1020050081226 | 8/2005 |

\* cited by examiner

*Primary Examiner*—Ted M Wang
(74) *Attorney, Agent, or Firm*—The Farrell Law Firm, LLP (57) ABSTRACT

Provided is an apparatus and method for controlling a dynamic range of weight vectors according to a combining method to fit an input range of a channel decoder in a mobile station of a high rate packet data system. The apparatus includes a channel estimator for receiving pilot symbol from a base station and calculating channel estimation values of receive paths of each antenna, an autocorrelation matrix calculator for calculating autocorrelation matrix values in every chip duration from the received pilot symbols, a weight vector calculator for calculating weight vectors using the channel estimation values and/or autocorrelation matrix values according to a combining method of the multi-path received signals, a controller for outputting modified weight vectors by fitting an input range of a channel decoder according to the combining method, and a combiner for outputting the combined signal by multiplying descrambled received signals by the modified weight vectors. Accordingly, even if various combining methods are used when data is received in a mobile station of a high rate packet data system using the CDMA scheme, performance degradation of a channel decoder can be minimized.

16 Claims, 4 Drawing Sheets

APPARATUS AND METHOD FOR CONTROLLING DYNAMIC RANGE OF WEIGHT VECTORS ACCORDING TO COMBINING METHODS IN A MOBILE STATION EQUIPPED WITH MULTIPLE ANTENNAS IN HIGH RATE PACKET DATA SYSTEM USING CODE DIVISION MULTIPLE ACCESS SCHEME

PRIORITY

This application claims the benefit under 35 U.S.C. §119(a) of a Patent Application filed in the Korean Intellectual Property Office on Jan. 26, 2006 and assigned Serial No. 2006-8551, the contents of which are incorporated herein by reference.

BACKGROUND

1. Field of the Invention

The present invention relates generally to a receiving apparatus and method of a mobile station in a high rate packet data system using a Code Division Multiple Access (CDMA) scheme, and in particular, to an apparatus and method for controlling a dynamic range of weight vectors according to various combining methods to fit an input range of a channel decoder in a mobile station using the various combining methods.

2. Description of the Related Art

In general, mobile communication systems are classified based on communication methods into a Frequency Division Multiple Access (FDMA) scheme in which a predetermined frequency band is divided into a plurality of frequency channels, each channel being assigned to an individual subscriber a Time Division Multiple Access (TDMA) scheme in which a plurality of subscribers share a single frequency channel by time-slicing the frequency channel, and a Code Division Multiple Access (CDMA) scheme in which a plurality of subscribers share the same frequency band at the same time by using different codes assigned thereto. The rapid development of communication technology has allowed mobile communication systems to provide a conventional phone call service and a high-speed data service for transmitting not only email or still images but also bulk digital data, such as a moving picture, in a mobile station.

Representative examples of mobile communication systems providing the high-speed data service using the CDMA scheme are Evolution Data Only (EV-DO) in which data can be transmitted at a high rate and Evolution of Data and Voice (EV-DV) suggested to cover a problem of EV-DO that a voice service and a data service cannot be supported at the same time.

In high rate packet data systems using the CDMA scheme, it is difficult to provide a high-speed packet data service of good quality due to frequency selective fading according to multiple paths, which occurs when an RF signal transmitted from a base station arrives at a mobile station after being reflected by various scatters near the mobile station, time selective fading according to Doppler spread, which occurs when a mobile station moves, and co-channel interference influenced by an adjacent base station when frequency reusability is close to 1.

In order to address this problem, Multiple Input Multiple Output (MIMO) technology, which is one of multiple antenna schemes, has been suggested. When a base station transmits high-speed packet data to a mobile station, if the number of antennas of the base station, which is related to transmit diversity, is increased, and if the number of antennas of the mobile station, which is related to receive diversity, is increased, a diversity gain is increased. Using these schemes, the fading and interference described above can be effectively reduced, angle spread of paths received to each antenna of the mobile station can be reduced, and if an incident angle of each path is different, and interference due to multiple paths can be reduced using multiple antennas, and accordingly, communication systems using multiple antennas has been developed.

However, since the size of each of mobile stations is limited, it is difficult in reality to equip the mobile station with more than two antennas in. When a mobile station moves from a base station, with which the mobile station is maintaining a current link, to an adjacent base station, the action that the mobile station connects a link to the adjacent base station while maintaining the current link is called soft handoff. Since each base station in a synchronous CDMA system has a unique short Pseudo-Noise (PN) code, a mobile station can maintain links with two or three base stations at the same time while maintaining a frequency reusability of 1.

However, in a TDMA system, a mobile station cannot communicate with two base stations in the same time slot at the same time, and in and FDMA system, a mobile station cannot communicate with two base stations in the same frequency slot at the same time, and thus, the implementation of soft handoff with frequency reusability close to 1 in the TDMA or FDMA scheme is more difficult than in the CDMA scheme. However, when the CDMA scheme is used, soft handoff is easy to implement, but in a case where a mobile station maintains a link with a single base station without soft handoff, a signal received from an adjacent base station acts as interference.

In the CDMA scheme, Walsh code having orthogonality unique to every mobile station is used. The orthogonality is satisfied only if Walsh codes are arranged at the same time point in a time axis. Walsh codes arranged at different time points act as significant interference in a multi-path environment due to non-orthogonality. Short PN code lessens the interference due to non-orthogonality. That is, since two short PN codes apart more than one chip from each other have an autocorrelation coefficient close to 0, which is inverse proportional to a code length, energy of a signal, which will act as interference, among signals passing through a Walsh decoder is reduced. Nonetheless, if the intensity of a signal received from an adjacent base station, which acts as an interference, is large, since the intensity of a signal received from a serving base station maintaining a current link is relatively low, the serving base station must radiate an electronic wave by properly performing power control.

In this case, the power control is necessary, and unlike a voice service for which an electronic wave is transmitted to a plurality of mobile stations at the same time, base stations in an EV-DO or EV-DV system transmit data to a single mobile station at the same time. Thus, in an EV-DO or EV-DV system, a forward packet data channel shows a time division characteristic, and a data rate is determined by means of rate control instead of power control. For a high-speed data service, a forward packet data channel uses a plurality of Walsh codes, and if soft handoff is supported using all Walsh codes, it is complicated for two or three base stations to assign a time slot in the time axis for a single mobile station.

Thus, EV-DO and EV-DV systems suggested by the Third Generation Partnership Project 2 (3GPP2), which is a standardization organization, are defined not to use soft handoff in a forward packet data channel. Accordingly, since packet data transmitted from an adjacent base station to another mobile station acts as an interference signal in the same channel to packet data received by a specific mobile station from a base station maintaining a current link, a technique for reducing the interference signal is required.

In order to reduce the interference signal, a receive end of a mobile station equipped with multiple antennas in an EV-DO or EV-DV system includes a RAKE receiver, assigning a finger to each of multiple paths, descrambling short PN code signals, multiplying the descrambled signals by proper weight vectors by performing channel estimation, and combining the multiplied signals. The combined signal is despread by a Walsh decoder, and transmitted bits are determined by a soft metric generator and an error correction decoder.

The combined signal obtained by multiplying the descrambled signals by weight vectors is input to a channel decoder, and various combining methods for calculating the weight vectors exist. Although a range of the combined signal varies according to each of the combining methods, an input range of the channel decoder to which the combined signal is input is limited in general. Thus, a technique for controlling a dynamic range of the weight vectors to fit the input range of the channel decoder even using the various combining method is required.

SUMMARY OF THE INVENTION

An aspect of the present invention is to substantially solve at least the above problems and/or disadvantages and to provide at least the advantages below. Accordingly, an aspect of the present invention is to provide an apparatus and method for preventing the performance of a channel decoder from being degraded in a mobile station including multiple antennas and selectively using at least one combining method in a high rate packet data system.

Another aspect of the present invention is to provide an apparatus and method for controlling a dynamic range of weight vectors for each combining method to fit an input range of a channel decoder in a mobile station of a high rate packet data system supporting Multiple Input Multiple Output (MIMO) technology.

A further aspect of the present invention is to provide an apparatus and method for controlling a dynamic range of weight vectors for each combining method to fit an input range of a channel decoder in a mobile station including multiple antennas and selectively using at least one combining method in a high rate packet data system using a Code Division Multiple Access (CDMA) scheme.

According to one aspect of the present invention, there is provided an apparatus for controlling a range of weight vectors to generate a combined signal of multi-path received signals in a mobile station of a high rate packet data system, the apparatus includes a channel estimator for receiving pilot symbols from a base station and calculating channel estimation values of receive paths of each antenna; an autocorrelation matrix calculator for calculating autocorrelation matrix values in every determined chip duration from the received pilot symbols; a weight vector calculator for calculating weight vectors using the channel estimation values and/or autocorrelation matrix values according to a combining method of the multi-path received signals; a controller for outputting modified weight vectors by fitting an input range of a channel decoder according to the combining method; and combiner for outputting the combined signal by multiplying descrambled received signals by the modified weight vectors.

According to another aspect of the present invention, there is provided a method of controlling a range of weight vectors to generate a combined signal of multi-path received signals in a mobile station of a high rate packet data system, the method includes receiving a pilot symbols from a base station, calculating channel estimation values of receive paths of each antenna, and calculating autocorrelation matrix values in every chip duration from the received pilot symbols; calculating weight vectors using the channel estimation values and/or autocorrelation matrix values according to a combining method of the multi-path received signals; calculating modified weight vectors by fitting an input range of a channel decoder according to the combining method; and outputting the combined signal by multiplying descrambled received signals by the modified weight vectors.

BRIEF DESCRIPTION OF THE DRAWINGS

The above and other aspects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

To assist in the understanding of the present invention, a wireless environment of a high rate packet data system using a Code Division Multiple Access (CDMA) scheme according to the present invention will now be described with reference to FIG. 1. Although the high rate packet data system according to the present invention will be described by illustrating an Evolution Data Only (EV-DO) or Evolution of Data and Voice (EV-DV) system, the high rate packet data system is not limited to the EV-DO or EV-DV system. In the current embodiment, it is assumed for convenience of description that the number of multiple antennas of a mobile station is 2.

Figure 1:
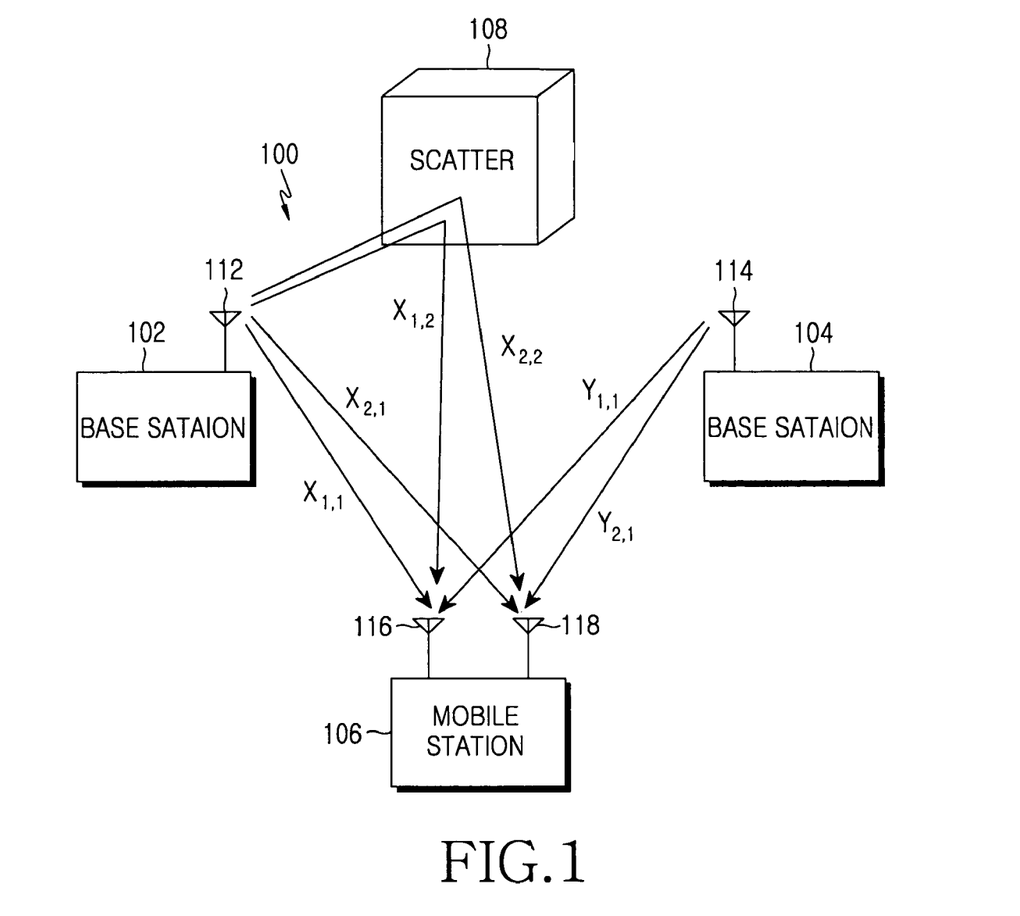
FIG. 1 illustrates a wireless environment of a high rate packet data system using a Code Division Multiple Access (CDMA) scheme according to the present invention.

Referring to FIG. 1, the high rate packet data system includes first and second base stations 102 and 104, a mobile station 106 transmitting and receiving Radio Frequency (RF) signals with the base stations 102 and 104, and a scatter 108 providing a multi-path environment in which the RF signals are transmitted. Each of the first and second base stations 102 and 104 include a single transmission antenna 112 or 114, and the mobile station 106 includes multiple antennas 116 and 118. If it is assumed that the mobile station 106 maintains a link with the first base station 102 and receives interference signals from the second (adjacent) base station 104, signals required for the mobile station 106 to demodulate signals transmitted from the first base station 102 are 4-path signals $X_{1,1}$, $X_{2,1}$, $X_{1,2}$, and $X_{2,2}$, and the interference signals are 2-path signals $Y_{1,1}$ and $Y_{2,1}$.

Among the multiple paths, signals through a first path are $X_{1,1}$ and $X_{2,1}$, and signals through a second path are $X_{1,2}$ and $X_{2,2}$. A first subscript of each path signal described above denotes a number for distinguishing the antennas 116 and 118 of the mobile station 106, and a second subscript denotes a number for distinguishing the paths. Based on the same transmission information transmitted from the first base station 102, since the second path signals $X_{1,2}$ and $X_{2,2}$ are signals reflected by the scatter 108, a longer delay occurs in the second path signals $X_{1,2}$ and $X_{2,2}$ than the first path signals $X_{1,1}$ and $X_{2,1}$. The transmission delay can be distinguished only if it is greater than a single chip in the CDMA scheme.

In addition, a multi-path channel has more than two transmission paths, a distance between the antennas 116 and 118 of the mobile station 106 is in general shorter than a half of a wavelength of a transmission electronic wave, and a chip length of the CDMA scheme is greater than the wavelength of a transmission electronic wave. Thus, a delay between the first path signals $X_{1,1}$ and $X_{2,1}$ and a delay between the second path signals $X_{1,2}$ and $X_{2,2}$ can be ignored.

Figure 2:
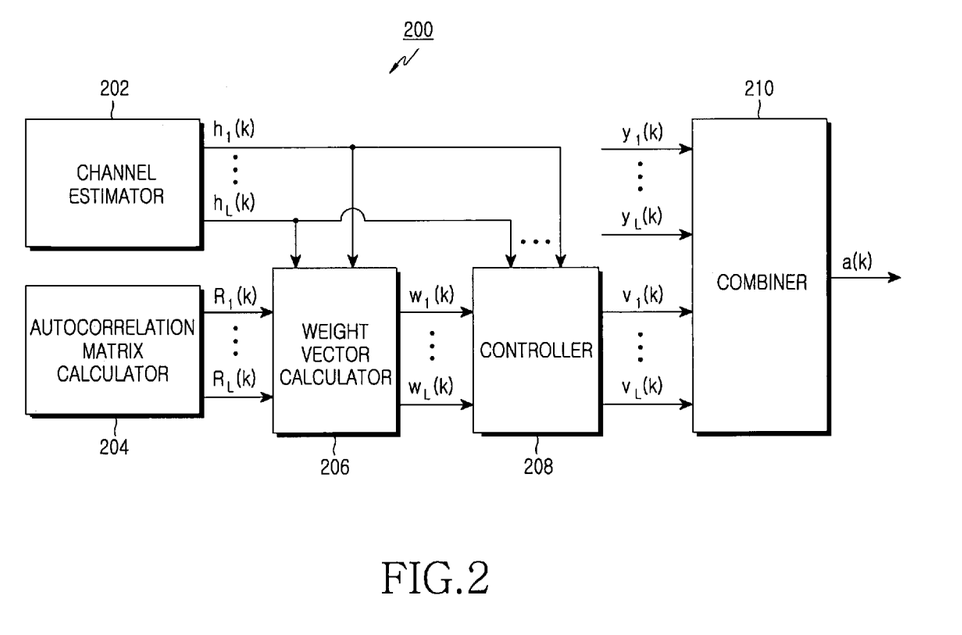
FIG. 2 is a block diagram of an apparatus for controlling a dynamic range of weight vectors applied to a combiner of a mobile station in a high rate packet data system according to the present invention.

FIG. 2 is a block diagram of an apparatus for controlling a dynamic range of weight vectors applied to a combiner of a mobile station in a high rate packet data system according to the present invention.

Referring to FIG. 2, a channel estimator 202 estimates channels assigned to receive paths per antenna by fingers (not shown) using pilot symbols known to both a base station and a mobile station and outputs channel estimation values $h_1(k)$ through to $h_L(k)$, as defined by Equation (1).

$$h_l(k) = [h_{1,l}(k) h_{2,l}(k)]^T \quad (1)$$

In Equation (1), the variable k denotes a chip index, $h_{1,l}(k)$ denotes a channel estimation value of a finger assigned to an $l^{th}$ path of a first antenna, and $h_{2,l}(k)$ denotes a channel estimation value of a finger assigned to the $l^{th}$ path of a second antenna.

In addition, T denotes a transpose, and the channel estimation values $h_{1,l}(k)$ and $h_{2,l}(k)$ can be obtained from a pilot symbol.

In and EV-DV system, channel estimation values of the channel estimator 202 are updated once a duration (64 or 128 chips) between two pilot symbols. If the length of each pilot symbol is 128 chips and the channel estimation values in a duration are $h_l(1)$ through to $h_l(128)$, $h_l(k)$, $1 \leq k \leq 128$ in the duration has the same value regardless of the chip index k.

In an EV-DO system, channel estimation values of a data portion (800 chips) between two pilot symbols are estimated by performing smoothing or interpolation of more than two received pilot symbols. If the channel estimation values are $h_l(1)$ through to $h_l(800)$, $h_l(k)$, $1 \leq k \leq 800$ may be different according to the chip index k.

Since a structure of the channel estimator 202 in the EV-DV or EV-DO system is well known to those skilled in the art, the detailed description is omitted.

An autocorrelation matrix calculator 204 estimates noise variances and noise covariances from the pilot symbols received from the base station and outputs autocorrelation matrices $R_1(k)$ through to $R_L(k)$.

For example, in the EV-DV system, autocorrelation matrix values are updated once a duration (64 or 128 chips) between two pilot symbols, and in the EV-DO system, the autocorrelation matrix values are updated once a half slot (1024 chips).

Equation (2) represents the autocorrelation matrices.

$$R_l(k) = \begin{bmatrix} \sigma_{1,l}^2(k) & \rho_l(k) \\ \rho_l^*(k) & \sigma_{2,l}^2(k) \end{bmatrix} \quad (2)$$

In Equation (2), $\sigma_{1,l}^2(k)$ denotes a first noise variance of PN scrambled signal estimated by the finger assigned to the $l^{th}$ path of the first antenna, $\sigma_{2,l}^2(k)$ denotes a second noise variance of a PN scrambled signal estimated by the finger assigned to the $l^{th}$ path of the second antenna, $\rho_l(k)$ denotes a covariance of the first and second noise variances, and * denotes conjugate. The number of autocorrelation matrices $R_l(k)$ is equal to the number of multiple paths.

Since a method of estimating noise variances and noise covariances is well known to those skilled in the art, the detailed description is omitted.

A weight vector calculator 206 calculates weight vectors according to a combining method selected from among three combining methods described below using the channel estimation values of Equation (1), the autocorrelation matrix values of Equation (2), and the selected combining method. Thus, the weight vector calculator 206 has an algorithm for performing the selected combining method.

A receiver of the mobile station generates a combined signal by multiplying descrambled received signals by the weight vectors, and various combining methods exist as well known. Representative combining methods are a Pilot Weight Combining (PWC) method, a Maximum Ratio Combining (MRC) method, and a Minimum Mean-Square Error Combining (MMSEC) method.

The PWC method is a method of determining an output signal of a channel compensator (not shown) as a weight, and the MRC method is a method of determining a weight by considering the variance of noise existing in each descrambled finger output signal. Output signals of two fingers detecting the same paths from two antennas are correlated. The MMSEC method is a method of determining a weight by considering the correlation value. A dynamic range of each of the combined signals output by means of the three combining methods varies according to which combining method is used.

Advantages and disadvantages of a weight vector equation of each of the PWC, MRC, and MMSEC methods and a selected combining method will now be described with reference to Equations (3) to (5). The three combining methods are only representative combining methods, and other combining method can be applied to the present invention.

In the PWC method, weight vectors are calculated using Equation (3).

$$w_l(k) = [h_{1,l}(k) h_{2,l}(k)]^T \quad (3)$$

The PWC method has lower performance but is easier to implement than the other combining methods.

In the MRC method, weight vectors are calculated using Equation (4).

$$w_l(k) = \begin{bmatrix} \sigma_{1,l}^2(k) & 0 \\ 0 & \sigma_{2,l}^2(k) \end{bmatrix}^{-1} \begin{bmatrix} h_{1,l}(k) \\ h_{2,l}(k) \end{bmatrix} \quad (4)$$

-continued $$= \left[ \begin{array}{cc} \frac{h_{1,l}(k)}{\sigma_{1,l}^2(k)} & \frac{h_{2,l}(k)}{\sigma_{2,l}^2(k)} \end{array} \right]^T$$

The MRC method provides universal performance and is easier to implement than the MMSEC method.

In the MMSEC method, weight vectors are calculated using Equation (5).

$$w_l(k) = \left[ \begin{array}{cc} \sigma_{1,l}^2(k) & \rho_l(k) \\ \rho_l^*(k) & \sigma_{2,l}^2(k) \end{array} \right]^{-1} \left[ \begin{array}{c} h_{1,l}(k) \\ h_{2,l}(k) \end{array} \right] \quad (5)$$

The MMSEC method guarantees higher performance but is more difficult to implement than the PWC and MRC methods.

Figure 3A:
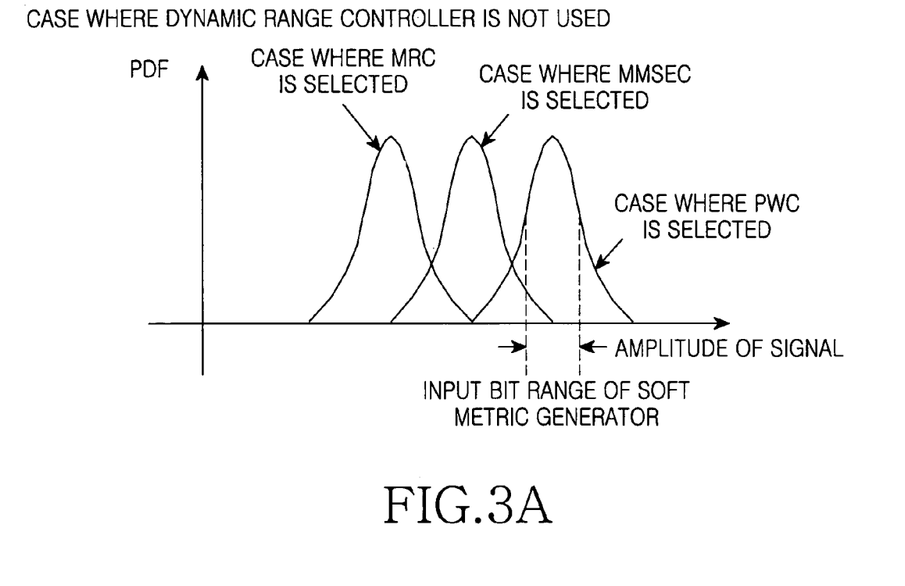
FIG. 3A is a graph showing a state where distributed ranges of combined signals input to a channel decoder are different according to combining methods in a mobile station of a conventional high rate packet data system.

FIG. 3A is a graph showing a state where distributed ranges of combined signals input to a channel decoder (not shown) are different according to combining methods in a mobile station of a conventional high rate packet data system.

FIG. 3A shows distribution of a probability density function of a combined signal output from a combiner 210 using each of the PWC, MRC, and MMSEC methods when weight vectors $w_1(k)$ through to $w_L(k)$, calculated using Equation (3), (4), or (5), are multiplied by descrambled finger output signals $y_1(k)$ through to $y_L(k)$.

If the weight vectors $w_1(k)$ through to $w_L(k)$ output from the weight vector calculator 206 are used without modification, a range of the combined signal output from the combiner 210 and input to the channel decoder has a different distribution according to the combining methods used.

In general, an input range of a soft metric generator (not shown) included in the channel decoder has a limited range considering the complexity of the channel decoder, and a combining method basically used to determine the input range is the PWC method. However, if weight vectors calculated using the MRC, MMSEC, or other combining method are used without modification, since an input bit range of a combined signal varies, the performance of the channel decoder having the limited input range is degraded.

In order to minimize the performance degradation of the channel decoder even if various combining methods are used, a range of a combined signal input to the channel decoder (output from the combiner 210) must be able to be controlled. To do this, in the current embodiment, a dynamic range of weight vectors output from the weight vector calculator 206 is controlled.

Figure 3B:
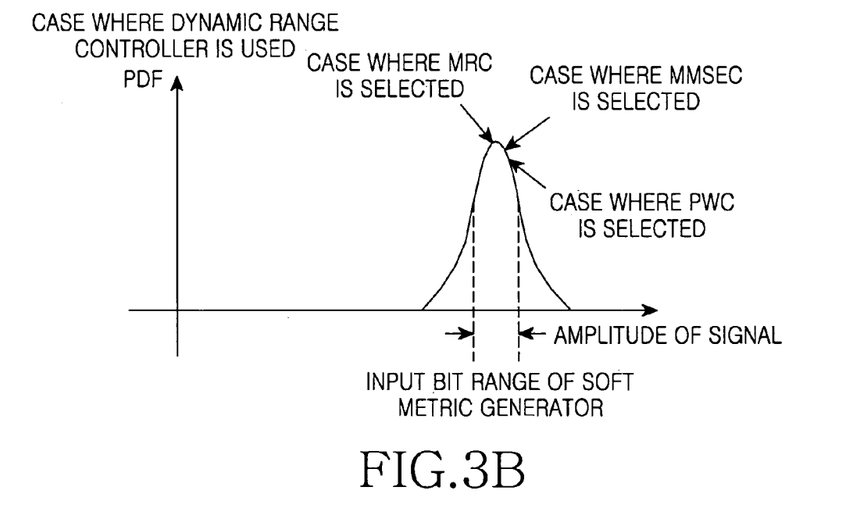
FIG. 3B is a graph showing a state where distributed ranges of combined signals input to a channel decoder are the same even in different combining methods when a dynamic range of weight vectors is controlled according to the present invention.

The weight vector calculator 206 calculates the weight vectors $w_1(k)$ through to $w_L(k)$ using a combining method selected from among the PWC, MRC, and MMSEC methods and outputs the weight vectors $w_1(k)$ through to $w_L(k)$ to a controller 208. The controller 208 outputs weight vectors $v_1(k)$ through to $v_L(k)$ modified by controlling the dynamic range of the weight vectors $w_1(k)$ through to $w_L(k)$, using Equations (6), (7), and (8), to fit the input range of the channel decoder even if an arbitrary combining method is selected. FIG. 3B is a graph showing a state where distributed ranges of combined signals input to a channel decoder are the same even when different combining methods are used when a dynamic range of weight vectors is controlled according to the present invention.

The controller 208 controls a dynamic range of weight vectors used to generate a combined signal input to a Walsh decover (not shown) and the soft metric generator, i.e., the channel decoder.

In the current embodiment, a scale factor Z(k) for controlling the dynamic range of weight vectors is defined using Equation (6).

$$Z(k) = \frac{\sum_{l=1}^{L} h_l^H(k) h_l(k)}{\sum_{l=1}^{L} w_l^H(k) h_l(k)} \quad (6)$$

In Equation (6), L denotes the number of multiple paths, the superscript H of $h_l(k)$ and $w_l(k)$ denotes an Hermitian transpose. For example, when a vector x is $x=[1+j,2-3*j]^T$, $x^H=[1-j,2+3*j]$. Here, T denotes a transpose, x denotes a column vector, and $x^H$ denotes a row vector. The scale factor Z(k) is not an imaginary number but a real number due to H.

The modified weight vector $v_1(k)$ output from the controller 208 is used by delaying the scale factor Z(k) of Equation (6) as represented by Equation (7).

$$v_l(k)=f(Z(k),Z(k-1),Z(k-2),\ldots,Z(k-P))w_l(k) \quad (7)$$

In Equation (7), the variable P is a positive number, and the scale factor delay function $f$ can be, for example, defined as Equation (8).

The scale factor Z(k) is used to fit a combined signal using weight vectors into an input data range of the channel decoder, and the variable P is used to determine how many scale factors, each being delayed with a chip interval, is used to obtain the modified weight vector $v_l(k)$.

$$f(Z(k-1),Z(k-2),\ldots,Z(k-P))=Z(k-64) \quad (8)$$

In Z(k−64) of Equation (8), "64" is an example of a case where a duration between two pilot symbols in the EV-DV system is 64 chips, and is set as a relevant-chip duration in a case where Equation (8) is applied to another system or a case where the duration between two pilot symbols is different.

If it is assumed that a PN descrambled signal of the finger assigned to the $l^{th}$ path of the first antenna is $y_{1,l}(k)$ and a PN descrambled signal of the finger assigned to the $l^{th}$ path of the second antenna is $y_{2,l}(k)$, the descrambled signal $y_l(k)$ input to the combiner 210 is defined as Equation (9).

$$y_l(k)=[y_{1,l}(k)y_{3,l}(k)]^T \quad (9)$$

If it is assumed that an output signal of the combiner 210 is a(k) and the weight vector modified according to the present invention is $v_l(k)$, a(k) is defined as Equation (10).

$$a(k) = \sum_{l=1}^{L} v_l^H(k) y_l(k) \quad (10)$$

In Equation (10), the superscript H denotes an Hermitian transpose, and the Hermitian transpose is used to counterbalance phase rotation occurring in a forward channel.

Figure 4:
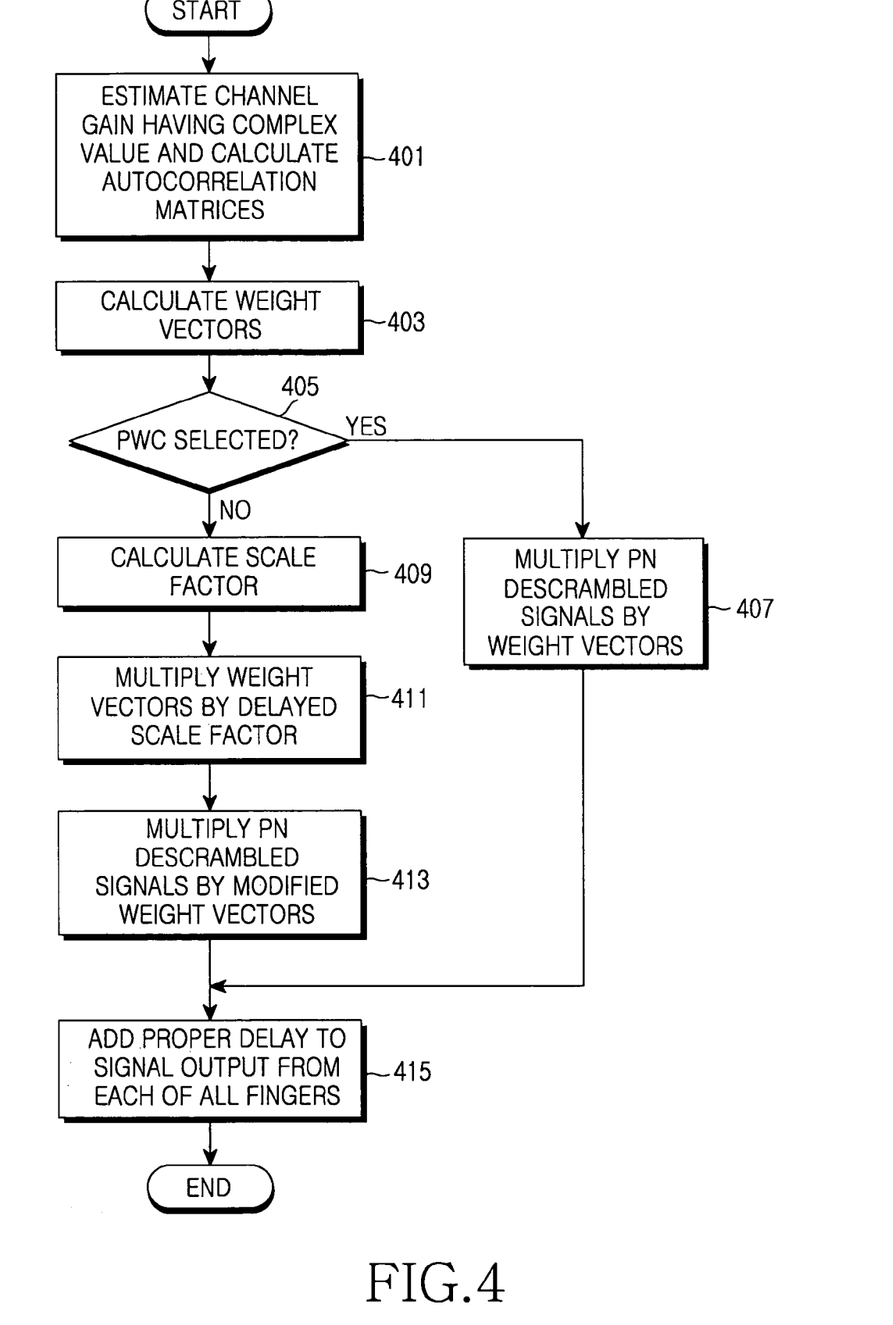
FIG. 4 is a flowchart illustrating a method of controlling a dynamic range of weight vectors applied to a combiner of a mobile station according to the present invention.

FIG. 4 is a flowchart illustrating a method of controlling a dynamic range of weight vectors applied to a combiner of a mobile station according to the present invention.

Referring to FIG. 4, in step 401, the channel estimator 202 of the mobile station, which has received an RF signal from a base station, estimates channels assigned to receive paths per antenna using pilot symbols known to both the base station and the mobile station by calculating Equation (1). The autocorrelation matrix calculator 204 estimates noise variances and noise covariances from the pilot symbols by calculating Equation (2).

In step 403, the weight vector calculator 206 calculates weight vectors corresponding to a combining method selected according to a channel environment by applying channel estimation values and/or autocorrelation matrix values to Equations (3), (4), or (5). The controller 208 determines in step 405 whether the PWC method has been selected as a combining method. If it is determined in step 405 that the PWC method has been selected, the controller 208 outputs weight vectors calculated using Equation 3 without modification.

The combiner 210 multiplies PN descrambled signals by the weight vectors calculated using Equation (3) in step 407 and outputs a combined signal by adding a proper delay to a signal output from each finger in step 415.

If it is determined in step 405 that the PWC method has not been selected, the controller 208 calculates a scale factor using the channel estimation values and weight vectors of a selected combining method by calculating Equation (6) in step 409.

In step 411, the controller 208 outputs weight vectors modified to fit an input range of a channel decoder by multiplying the weight vectors calculated according to the MRC method of Equation (4( or the MMSEC method of Equation (5) by the delayed scale factor. The combiner 210, which has received the modified weight vectors, multiplies the PN descrambled signals by the modified weight vectors in step 413 and outputs a combined signal by adding a proper delay to a signal output from each finger in step 415.

As described above, according to the present invention, even if various combining methods are used when data is received in a mobile station of a high rate packet data system using the CDMA scheme, performance degradation of a channel decoder can be minimized.

In addition, a dynamic range of weight vectors multiplied by PN descrambled signals can be controlled in a mobile station of a high rate packet data system using various combining methods.

In addition, various combining methods can be used according to a channel environment without varying precision of a data path next to a combiner in a mobile station of a high rate packet data system using the various combining methods.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for controlling a range of weight vectors to generate a combined signal of multi-path signals received in a mobile station of a high rate packet data system, the apparatus comprising:
   a channel estimator for receiving pilot symbols from a base station and calculating channel estimation values of receiving paths of antennas;
   an autocorrelation matrix calculator for calculating autocorrelation matrix values in every chip duration from the received pilot symbols;
   a weight vector calculator for calculating the weight vectors using the channel estimation values and/or the autocorrelation matrix values according to a combining method of the multi-path signals;
   a controller for outputting modified weight vectors by fitting an input range of a channel decoder according to the combining method; and
   a combiner for outputting the combined signal by multiplying descrambled received signals by the modified weight vectors.

2. The apparatus of claim 1, wherein the combining method comprises at least one of a Pilot Weighted Combining (PWC) method, a Maximum Ratio Combining (MRC) method, and a Minimum Mean-Square Error Combining (MMSEC) method.

3. The apparatus of claim 1, wherein the controller is further configured to select the combining method according to a channel environment.

4. The apparatus of claim 1, wherein the controller is further configured to determine, based on the combining method used, whether the weight vectors are modified.

5. The apparatus of claim 1, wherein the controller modifies the weight vectors by using a scale factor for controlling the dynamic range of the weight vectors.

6. The apparatus of claim 5, wherein if it is assumed that the scale factor is Z(k), the scale factor is defined by $$Z(k) = \frac{\sum_{l=1}^{L} h_l^H(k) h_l(k)}{\sum_{l=1}^{L} w_l^H(k) h_l(k)},$$

where w(k) denotes a weight vector according to the combining method, h(k) denotes a channel estimation value, L denotes the number of multiple paths, the superscript H in h(k) and w(k) denotes an Hermitian transpose.

7. The apparatus of claim 6, wherein the modified weight vector $v_l(k)$ is used of delaying the scale factor Z(k) by $$v_l(k) = f(Z(k), Z(k-1), Z(k-2), \ldots, Z(k-P)) w_l(k),$$

where P is a positive number denoting a chip duration for delaying the scale factor, and $f$ denotes a scale factor delay function.

8. The apparatus of claim 7, wherein when the mobile station comprises two antennas, if a PN descrambled signal of an $l^{th}$ path of a first antenna is $y_{1,l}(k)$ and a PN descrambled signal of the $l^{th}$ path of a second antenna is $y_{2,l}(k)$, the descrambled received signal of the $l^{th}$ path, $y_l(k)$ input to the combiner is defined by $$y_l(k) = [y_{1,l}(k) y_{2,l}(k)]^T,$$

and if the combined signal is a(k) and the modified weight vector is $V_l(k)$, the combined signal is defined by $$a(k) = \sum_{l=1}^{L} v_l^H(k) y_l(k).$$

9. A method of controlling a range of weight vectors to generate a combined signal of multi-path signals received in a mobile station of a high rate packet data system, the method comprising:
   receiving pilot symbols from a base station, calculating channel estimation values of receiving paths of antennas, and calculating autocorrelation matrix values in every chip duration from the received pilot symbols;

calculating the weight vectors using the channel estimation values and/or the autocorrelation matrix values according to a combining method of the multi-path signals;

calculating modified weight vectors by fitting an input range of a channel decoder according to the combining method; and outputting the combined signal by multiplying descrambled received signals by the modified weight vectors.

10. The method of claim 9, wherein the combining method comprises at least one of a Pilot Weighted Combining (PWC) method, a Maximum Ratio Combining (MRC) method, and a Minimum Mean-Square Error Combining (MMSEC) method.

11. The method of claim 9, wherein the calculating of the weight vectors further comprises selecting the combining method according to a channel environment.

12. The method of claim 9, wherein the calculating of the modified weight vectors further comprises determining, based on the combining method used, whether the weight vectors are modified.

13. The method of claim 9, wherein the calculating of the modified weight vectors further comprises modifying the dynamic range of the weight vectors by using a scale factor.

14. The method of claim 13, wherein if it is assumed that the scale factor is $Z(k)$, the scale factor is defined by $$Z(k) = \frac{\sum_{l=1}^{L} h_l^H(k) h_l(k)}{\sum_{l=1}^{L} w_l^H(k) h_l(k)},$$

where $w(k)$ denotes a weight vector according to the combining method, $h(k)$ denotes a channel estimation value, L denotes the number of multiple paths, the superscript H in $h(k)$ and $w(k)$ denotes an Hermitian transpose.

15. The method of claim 14, wherein the modified weight vector $v_l(k)$ is used of delaying the scale factor $Z(k)$ by $$v_l(k) = f(Z(k), Z(k-1), Z(k-2), \ldots, Z(k-P)) w_l(k),$$

where P is a positive number denoting a chip duration for delaying the scale factor, and $f$ denotes a scale factor delay function.

16. The method of claim 15, wherein when the mobile station comprises two antennas, if it is assumed that a PN descrambled signal of an $l^{th}$ path of a first antenna is $y_{1,l}(k)$ and a PN descrambled signal of the $l^{th}$ path of a second antenna is $y_{2,l}(k)$, the descrambled received signal of the $l^{th}$ path, $y_l(k)$ input to the combiner is defined by $$y_l(k) = [y_{1,l}(k) y_{2,l}(k)]^T,$$

and if the combined signal is $a(k)$ and the modified weight vector is $v_l(k)$, the combined signal is defined by $$a(k) = \sum_{l=1}^{L} v_l^H(k) y_l(k).$$

* * * * *